US009043475B2

(12) United States Patent
Bian et al.

(10) Patent No.: US 9,043,475 B2
(45) Date of Patent: May 26, 2015

(54) METHOD AND SYSTEM FOR ACTIVATING NETWORK STORAGE, MESSAGE PROCESSING SERVER, AND CLIENT

(75) Inventors: Yonggang Bian, Shenzhen (CN); Lunjian Mu, Shenzhen (CN); Jue Wang, Shenzhen (CN); Guojun Xu, Shenzhen (CN); Gang Liang, Shenzhen (CN); Cheng Huang, Shenzhen (CN); Yongjing Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 769 days.

(21) Appl. No.: 13/022,989

(22) Filed: Feb. 8, 2011

(65) Prior Publication Data

US 2011/0161502 A1 Jun. 30, 2011

Related U.S. Application Data

(63) Continuation of application No. PCT/CN2008/073857, filed on Dec. 30, 2008.

(30) Foreign Application Priority Data

Aug. 8, 2008 (CN) .......................... 2008 1 0142353

(51) Int. Cl.
*G06F 15/16* (2006.01)
*H04L 29/06* (2006.01)
(Continued)

(52) U.S. Cl.
CPC ........ *H04L 65/1063* (2013.01); *H04L 12/1827* (2013.01); *H04M 3/42221* (2013.01);
(Continued)

(58) Field of Classification Search
CPC ............ H04L 65/1006; H04L 65/1083; H04L 12/1827; H04L 12/1831; H04M 3/42221
USPC ......................................... 709/227
See application file for complete search history.

(56) References Cited

U.S. PATENT DOCUMENTS 7,031,326 B1 * 4/2006 Shur et al. .................. 370/401
7,254,643 B1 * 8/2007 Peters et al. ................ 709/246
(Continued)

FOREIGN PATENT DOCUMENTS

CN 1991744 A 7/2007
CN 101030964 A 9/2007
(Continued)

OTHER PUBLICATIONS

Mahy et al., RFC 3911: The Session Initiation Protocol (SIP) "Join" Header, Oct. 2004.*
(Continued)

*Primary Examiner* — Joseph E Avellino
*Assistant Examiner* — James Conaway
(74) *Attorney, Agent, or Firm* — Conley Rose, P.C.; Grant Rodolph; Nicholas K. Beaulieu

(57) ABSTRACT

A method for activating network storage includes: a message processing server receives a network storage request from a client; the message processing server establishes a session with a history function (HF) according to the network storage request, and sends the content from the session in which the client participates to the HF through the session with the HF. A system for activating network storage, a message processing server, and a client are also provided. With the present invention, the network storage is implemented more conveniently, and the user experience is improved.

13 Claims, 7 Drawing Sheets

(51) Int. Cl.
*H04L 12/18* (2006.01)
*H04M 3/42* (2006.01)
*H04L 29/08* (2006.01)

(52) U.S. Cl.
CPC ......... *H04L65/1083* (2013.01); *H04L 12/1831* (2013.01); *H04L 65/1006* (2013.01); *H04L 65/403* (2013.01); *H04L 67/1097* (2013.01)

(56) References Cited

U.S. PATENT DOCUMENTS

| | | | |
|---|---|---|---|
| 7,738,638 B1* | 6/2010 | Henderson | 379/88.17 |
| 2003/0069982 A1 | 4/2003 | Harper et al. | |
| 2004/0028080 A1* | 2/2004 | Samarasinghe et al. | 370/486 |
| 2005/0018622 A1* | 1/2005 | Halbraich et al. | 370/260 |
| 2007/0118660 A1 | 5/2007 | Garcia-Martin | |
| 2007/0201637 A1* | 8/2007 | Brown et al. | 379/88.18 |
| 2008/0080482 A1* | 4/2008 | Calahan et al. | 370/352 |
| 2009/0041207 A1* | 2/2009 | Dilkie et al. | 379/70 |
| 2009/0074156 A1* | 3/2009 | Ku et al. | 379/35 |
| 2009/0185673 A1* | 7/2009 | Erhart et al. | 379/265.09 |
| 2009/0213839 A1* | 8/2009 | Davis et al. | 370/352 |

FOREIGN PATENT DOCUMENTS

| | | |
|---|---|---|
| CN | 101155049 A | 4/2008 |
| CN | 101202716 A | 6/2008 |
| WO | WO 2007/061251 A1 | 5/2007 |

OTHER PUBLICATIONS

International Search Report from P.R. China in International Application No. PCT/CN2008/073857 mailed May 14, 2009.
Foreign Communication From A Counterpart Application, Chinese Application 200810142353.X, Chinese Office Action dated Mar. 7, 2013, 5 pages.
Foreign Communication From A Counterpart Application, Chinese Application 200810142353.X, Partial Translation of Office Action dated Mar. 7, 2013, 3 pages.
Foreign Communication From A Counterpart Application, PCT Application PCT/CN2008/073857, English Translation of Written Opinion dated May 14, 2009, 4 pages.

* cited by examiner

METHOD AND SYSTEM FOR ACTIVATING NETWORK STORAGE, MESSAGE PROCESSING SERVER, AND CLIENT

CROSS-REFERENCE TO RELATED APPLICATIONS

This application is a continuation of International Application No. PCT/CN2008/073857, filed on Dec. 30, 2008, which claims priority to Chinese Patent Application No. 200810142353.X, filed on Aug. 8, 2008, both of which are hereby incorporated by reference in their entireties.

FIELD OF THE INVENTION

The present invention relates to the communication field, and in particular, to a method and system for activating network storage, a message processing server, and a client.

BACKGROUND OF THE INVENTION

In messaging services, the history storage function is a basic function, and a user may search the stored messages for previous contents exchanged with friends. The message storage function provided by the network may enable the user to search for previous contents by using different terminals, thus enriching the user experience.

The user may set whether to need network storage, and the message processing server may determine whether to store the messages according to the setting. According to different situations, the setting is divided into advance setting prior to the session and temporary setting in the session. Network storage scenarios generally include a scenario where a user wants to dynamically activate network storage in a conference session and a scenario where two Session Initiation Protocol (SIP) message clients need to dynamically activate and deactivate network storage in an ongoing one-to-one session.

In the above two scenarios, the Focus (conference center) must regard the history function (HF) that implements network storage as a special participant; the Focus invites the HF to participate in a session, and sends the session content to the HF through a session channel established between the Focus and the HF; the HF stores the session content. The Focus, however, may not regard the HF as a special session participant. For example, the Focus does not permit the HF to participate in the conference due to authorization and a limited number of participants. In this case, the Focus cannot send the user's private chat information to the HF, and the storage function cannot be implemented. In addition, to implement the history session storage function in a one-to-one session, the entire media channel of the session needs to be changed. Thus, the user experience is affected.

SUMMARY OF THE INVENTION

Embodiments of the present invention provide a method and system for activating network storage, a message processing server, and a client, so that the session content may be stored more conveniently in the session and that the user experience is improved.

A method for activating network storage includes: by a message processing server, receiving a network storage request from a client; and establishing a session with an HF according to the network storage request, and sending the session content of the client to the HF through the session with the HF.

A message processing server includes: a receiving module, configured to receive a network storage request from a client; and a processing module, configured to establish a session with an HF according to the network storage request, and send the session content of the client to the HF through the session with the HF.

A system for activating network storage includes a message processing server and an HF, where the HF is configured to: establish a session with the message processing server according to an instruction from the message processing server, and receive and store the session content of the client through the session.

A client includes: a judging unit, configured to determine that a session in which the client participates is not a conference session; and a sending unit, configured to send a network storage request to instruct a message processing server to activate network storage.

In embodiments of the present invention, the message processing server may directly establish a session with the HF. In this way, the network storage of the session content may also be implemented when the Focus may not regard the HF as a special session participant. In addition, if the network storage method in embodiments of the present invention is used in a one-to-one session, the entire media channel of the session does not need to be changed. Thus, the user experience is improved.

DETAILED DESCRIPTION OF THE EMBODIMENTS

In the method and system for activating network storage in embodiments of the present invention, the HF is not regarded as a special participant; an entity that processes the SIP message of a user in the SIP message system. That is, the message processing server, accepts a network storage activation request from the client, and activates network storage. In this way, the storage function may be implemented when the Focus does not regard the HF as a special participant, and the change of the media channel of the session may be avoided, thus improving the user experience.

Figure 1:
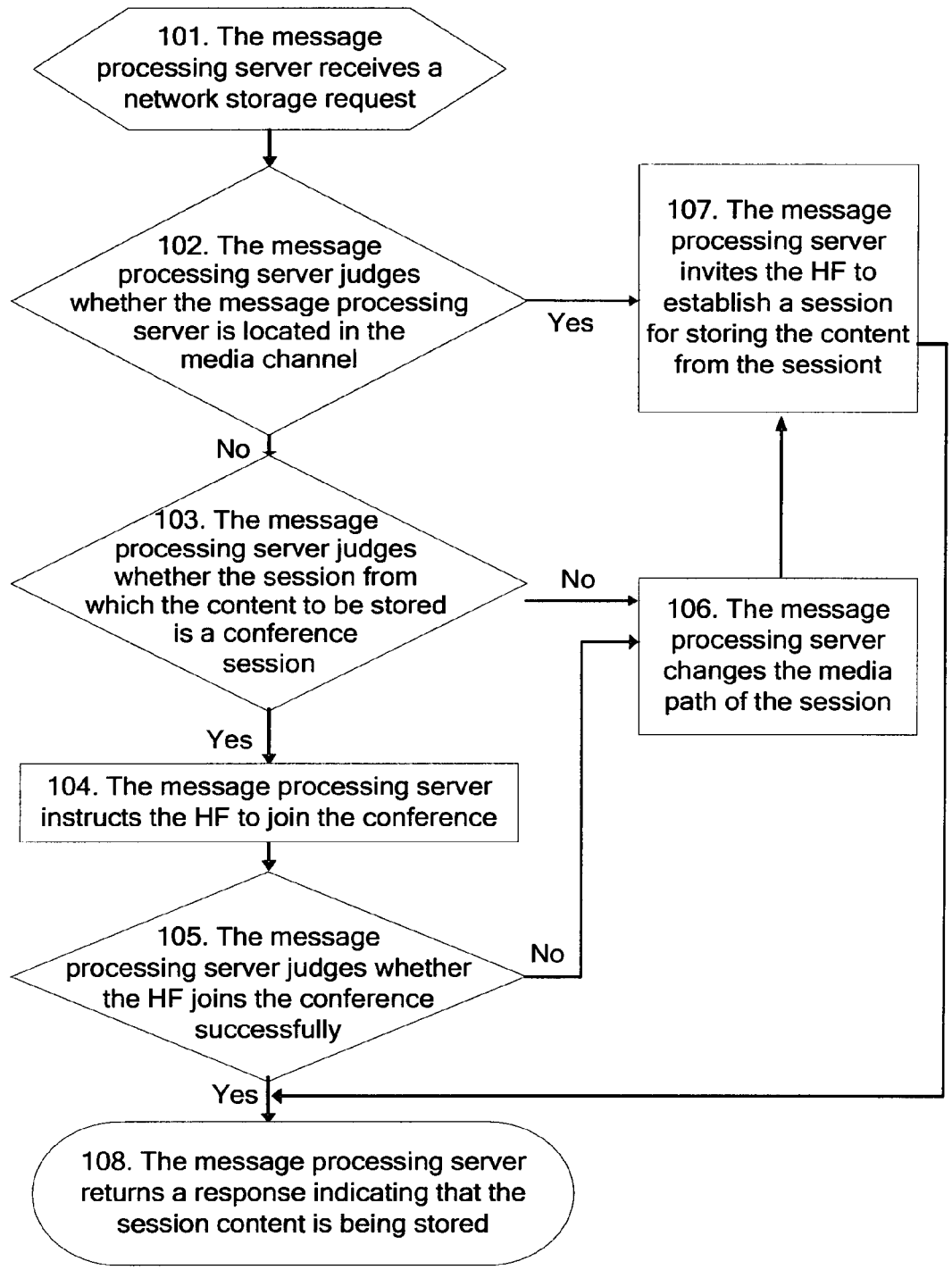
FIG. 1 is a flowchart of a method for activating network storage according to an embodiment of the present invention.

As shown in FIG. 1, the method for activating network storage according to an embodiment of the present invention includes the following steps:

Step 101: The message processing server receives a network storage activation request from the client, where the network storage activation request may be carried in a SIP MESSAGE or a SIP INFO message.

Step 102: The message processing server judges whether the message processing server is located in a media channel; if so, the process goes to step 107; otherwise the process goes to step 103.

Step 103: The message processing server judges whether the session of which the content is to be stored is a conference session; if so, the process goes to step 104; otherwise the process goes to step 106.

Step 104: The message processing server sends a SIP REFER message to the HF, instructing the HF to join the conference; after receiving the SIP REFER message, the HF sends a session invitation to the Focus, requesting to join the conference. During the session negotiation, the HF must confirm that the Focus can regard the HF as a special participant. This may be implemented by using the require header field in the SIP message when the HF sends a session invitation to the Focus. If the Focus regards the HF as a storage function, the HF may join the conference successfully; otherwise, the HF fails to join the conference. In addition, the HF notifies the message processing server of whether the HF joins the conference successfully through a SIP NOTIFY message.

Step 105: After receiving the SIP NOTIFY message from the HF, the message processing server judges whether the HF joins the conference successfully; if so, the process goes to step 108; otherwise the process goes to step 106.

Step 106: The message processing server sends a media change request to the session participants so that the message processing server is located in the media channel of the session.

Optionally, step 106 may also be as follows: When determining that the session of which the content is to be stored is not a conference session, the message processing server sends a SIP REFER message (that is, a conference creation request) that carries the addresses of the session participants and HF to a controlling function (CF), instructing the CF to invite the original session participants and the HF to join the conference after creating the conference; a participating function (PF) returns a message indicating that the network storage is activated successfully to the client.

Step 107: The message processing server invites the HF to establish a session between the HF and the message processing server, and sends the content to be stored to the HF for storing through the established session.

Step 108: The message processing server returns a response indicating that the network storage is being performed to the client, and records whether the network storage mode is inviting the HF to join the conference or establishing a session with the HF directly.

Figure 2:
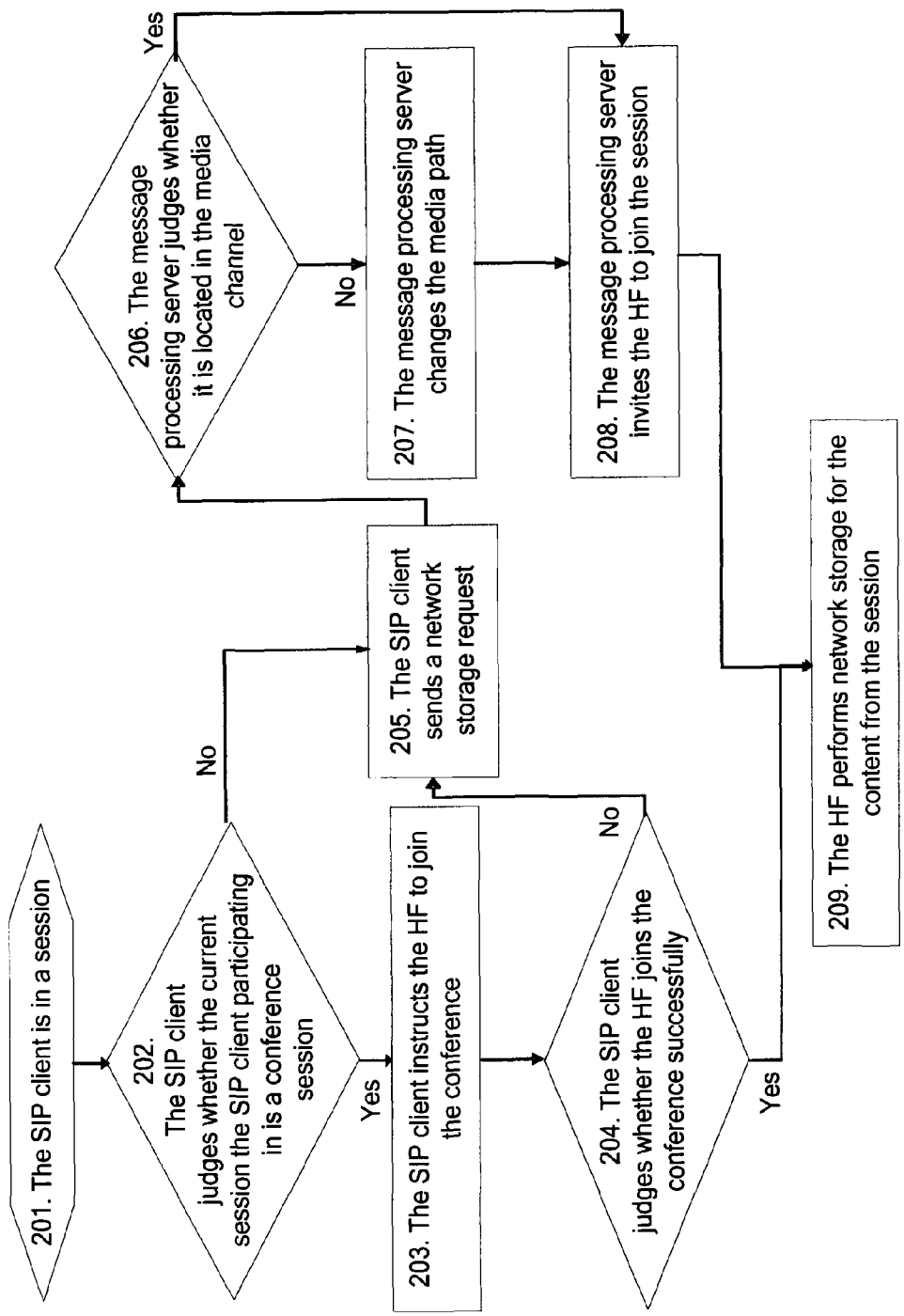
FIG. 2 is a flowchart of a method for activating network storage according to another embodiment of the present invention.

FIG. 2 is a flowchart of a method for activating network storage according to an embodiment of the present invention. The difference between the method shown in FIG. 1 and the method shown in FIG. 2 is as follows: In this embodiment, the client participating in the session judges whether the current session in which the client participates is a conference session or a P2P session when network storage is needed, and selects different network storage methods according to different session modes. The method includes the following steps:

Step 201: The SIP client is in a session. The SIP client in the session wants to implement network storage for content from the session in which the SIP client participates.

Step 202: The SIP client judges whether the current session in which the SIP client participates is a conference session; if so, the process goes to step 203; otherwise the process goes to step 205.

Step 203: The SIP client instructs the HF to join the conference. In this embodiment, during the session negotiation between the SIP client and the HF, the HF must confirm that the Focus regards the HF as a special participant.

Step 204: The SIP client receives a notification from the HF, and judges whether the HF joins the conference successfully according to the notification. If the HF joins the conference successfully, the process goes to step 208; otherwise the process goes to step 205.

Step 205: The SIP client sends a network storage activation request to the message processing server, where the network storage activation request may be carried in a SIP MESSAGE or a SIP INFO message.

Step 206: The message processing server judges whether it is located in the media channel; if so, the process goes to step 208; otherwise the process goes to step 207.

Step 207: The message processing server sends a media change request to the session participants so that the message processing server is located in the media channel of the session.

Step 208: The message processing server invites the HF to establish a session between the HF and the message processing server, and sends the content to be stored from the session in which the SIP client participates to the HF through the established session. The HF returns a response indicating that the network storage is activated successfully to the SIP client.

Step 209: The HF receives the content from the session in which the SIP client participates and performs network storage for the content from the session in which the SIP client participates. The SIP client records whether the network storage mode is joining the conference by the HF or establishing a session with the HF.

Figure 3:
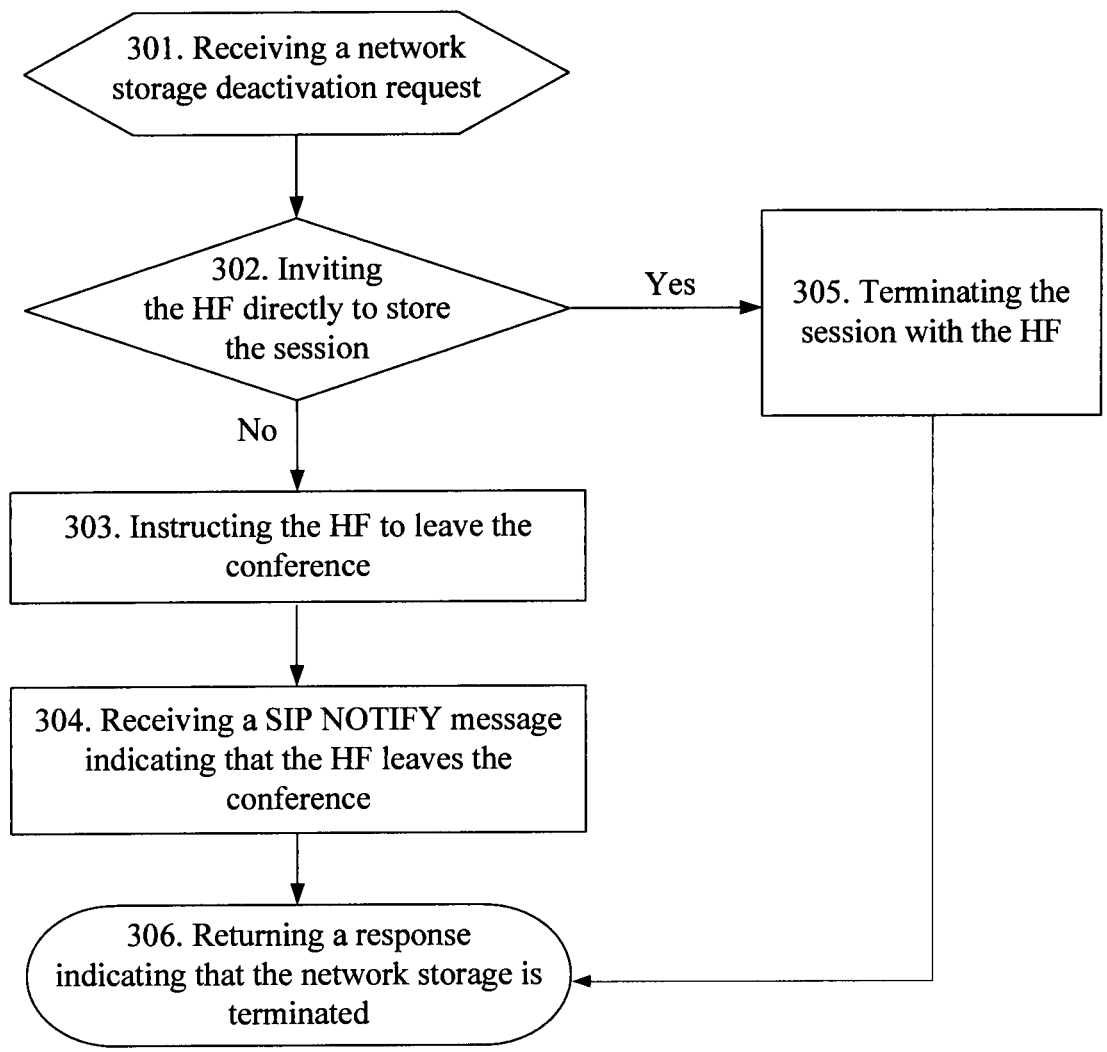
FIG. 3 is a flowchart of a method for deactivating the ongoing network storage after the network storage of a session is implemented according to an embodiment of the present invention.

In addition, in this embodiment, after the network storage is implemented for the session, the ongoing network storage may also be deactivated. As shown in FIG. 3, the method for deactivating the network storage includes the following steps:

Step 301: Receiving a network storage deactivation request from the client;

Step 302: Judging whether the network storage mode is inviting the HF to establish a session for sending the storage content; if so, go to step 305; otherwise, go to step 303;

Step 303: Sending a SIP REFER request to the HF to instruct the HF to leave the conference;

Step 304: Receiving a SIP NOTIFY message to indicate that the HF leaves the conference from the HF, and go to step 306 directly;

Step 305: Terminating the session with the HF;

After step 305, the message processing server may judge whether it needs to be located in the media channel according to the session parameter; if not, the message processing server initiates a request to both parties of the session, requesting to change the media channel of the session, so that the media does not pass through the message processing server.

Step 306: Sending a message indicating that the network storage is terminated to the client.

Figure 4:
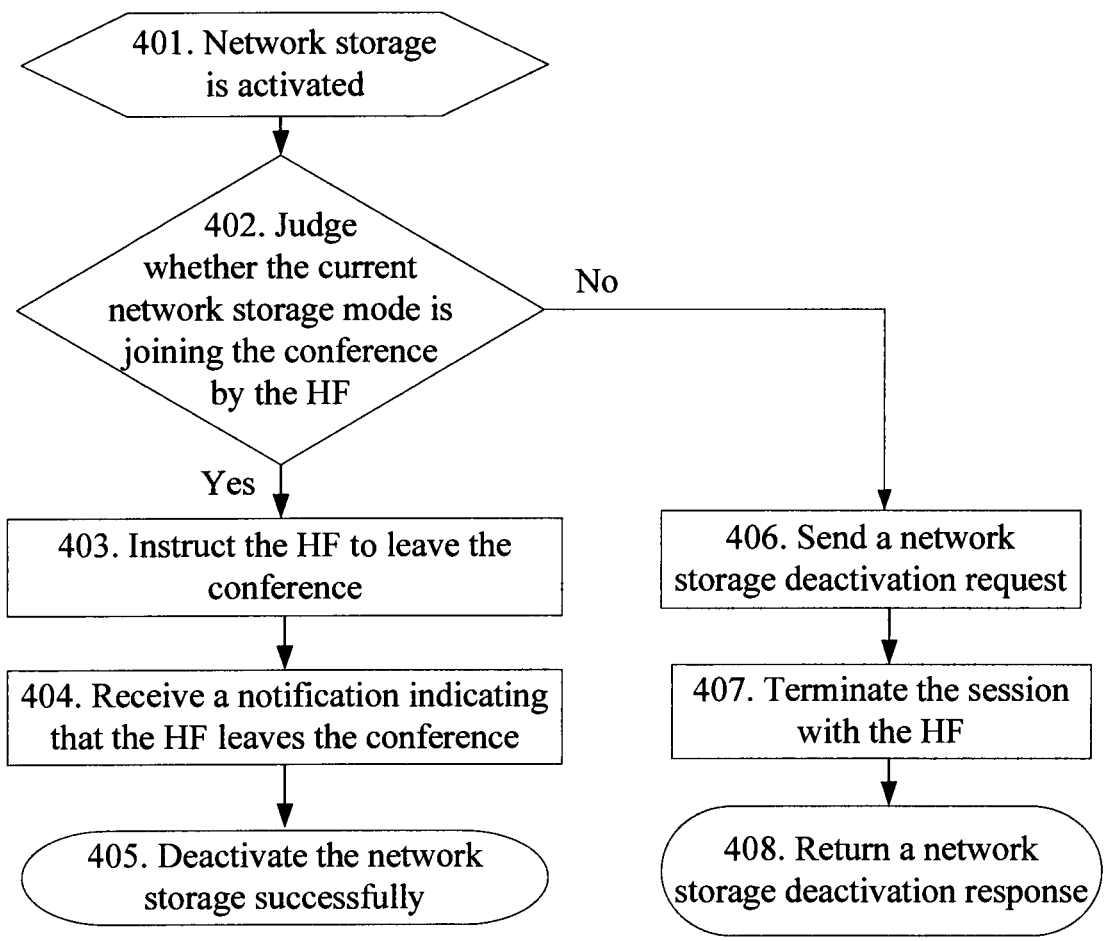
FIG. 4 is a flowchart of a method for deactivating the ongoing network storage corresponding to the method shown in FIG. 2 according to an embodiment of the present invention.

FIG. 4 is a flowchart of a method for deactivating the ongoing network storage corresponding to the method shown in FIG. 2 according to an embodiment of the present invention. The method includes the following steps:

Step 401: Network storage is activated. The SIP client in the session wants to deactivate the network storage for the content from the session in which the SIP client participates.

Step 402: The SIP client judges whether the current network storage mode is joining the conference by the HF. If so, the process goes to step 403; otherwise the process goes to step 406.

Step 403: The SIP client instructs the HF to leave the conference.

Step 404: The SIP client receives a conference leaving notification from the HF after the HF leaves the conference.

Step 405: The SIP client deactivates the network storage.

Step 406: The SIP client sends a network storage deactivation request to the message processing server.

Step 407: After receiving the network storage deactivation request, the message processing server terminates the session with the HF and deactivates the ongoing network storage.

Step 408: The message processing server returns a network storage deactivation response to the SIP client.

Figure 5:
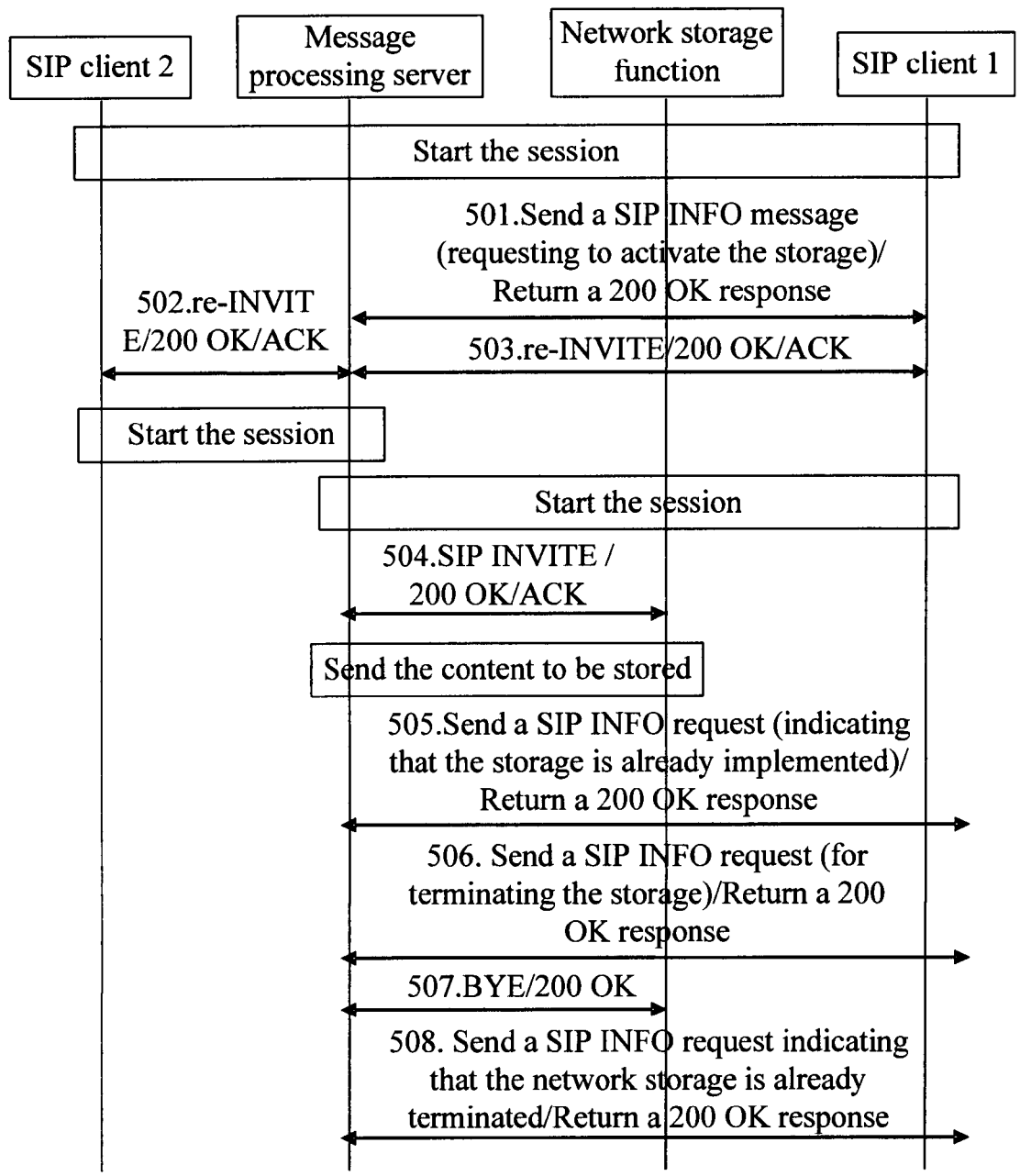
FIG. 5 shows a process of requesting to activate network storage by a SIP client in a peer-to-peer (P2P) session according to an embodiment of the present invention.

FIG. 5 illustrates a signaling interaction process of requesting to activate network storage during a P2P session according to an embodiment of the present invention. The process includes the following steps:

Step 501: Client 1 and client 2 are participating in a P2P session. During an ongoing session between client 1 and client 2, client 1 sends a SIP INFO message to the message processing server, requesting to activate network storage to store the content from the session between client 1 and client 2. The message processing server returns a SIP 200 OK response indicating that the network storage activation request is received.

Step 502 to step 503: The message processing server determines that the session of which the content is to be stored is a P2P session and that the message processing server is not located in the media channel, and sends a re-INVITE request to client 2 and client 1 respectively, requesting to change the session media, so that the message processing server is located in the media channel between client 1 and client 2. After receiving the re-INVITE request, client 1 and client 2 return a SIP 200 OK response to message processing server respectively. The message processing server sends a SIP ACK request to client 1 and client 2 respectively, and establishes a media stream with client 1 and client 2 respectively, so that the message processing server changes the original direct media stream between client 1 and client 2 to a media stream exchanged between client 1 and client 2.

Step 504: The message processing server sends a SIP INVITE request to the HF, requesting to establish a session with the HF to send the network storage content. The HF accepts the invitation and returns a SIP 200 OK response to the message processing server; the message processing server sends a SIP ACK request, and establishes a session with the HF to send the content to be stored.

Step 505: The message processing server sends a SIP INFO request indicating that the network storage is already implemented to client 1. Client 1 returns a SIP 200 OK response indicating that the SIP INFO request is already received.

After the network storage is implemented for the content from the session between client 1 and client 2, the user may deactivate the network storage of the content from the session between client 1 and client 2 through the message processing server. To deactivate the network storage of the content from the session between client 1 and client 2, the following steps may be executed:

Step 506: Client 1 sends a SIP INFO request to the message processing server, requesting to terminate the network storage of the content form the session between client 1 and client 2; the message processing server returns a SIP 200 OK response indicating that the request is received.

Step 507: The message processing server determines that the network storage mode is establishing a session with the HF directly to send the network storage content, and thus sends a SIP BYE request to the HF, requesting to terminate the session with the HF. The HF returns a SIP 200 OK response indicating that the session with the HF is terminated and that the session content is not stored.

Step 508: The message processing server sends a SIP INFO request indicating that the network storage is already terminated to client 1. Client 1 returns a SIP 200 OK response to the message processing server.

In another embodiment of the present invention, client 1 resends a SIP INFO request to the message processing server, requesting to activate the network storage; the message processing server returns a SIP 200 OK response. After receiving the SIP INFO message and requesting to activate the network storage from client 1 again, the message processing server sends a SIP INVITE request to the HF directly if determining that the message processing server is located in the media channel, requesting to establish a session for sending the content to be stored; the HF returns a SIP 200 OK response to the message processing server; the message processing server sends a SIP ACK request, establishes a session with the HF, and sends the content to be stored to the HF. In this way, step 502 and step 503 are omitted.

Figure 6:
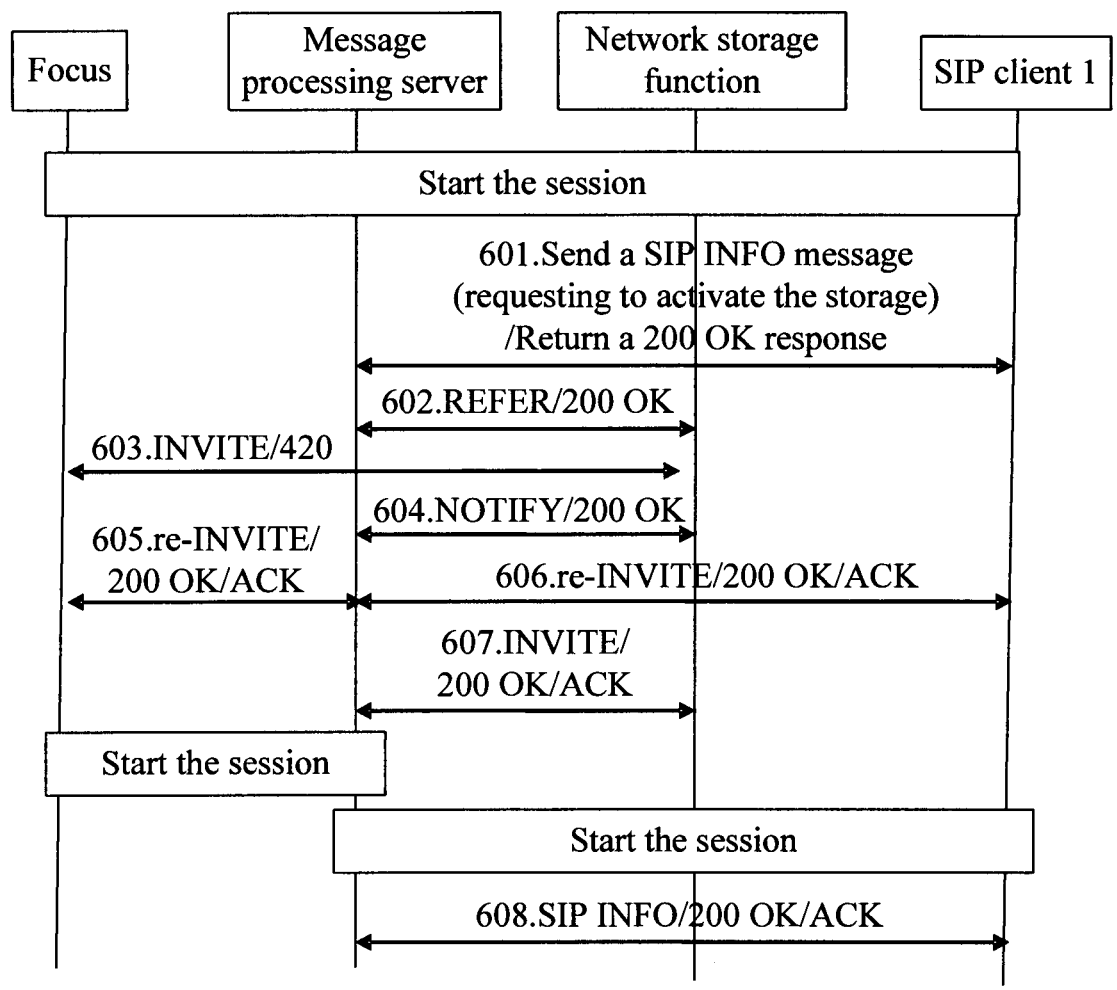
FIG. 6 shows a process of requesting to activate network storage by a SIP client during a conference according to an embodiment of the present invention.

FIG. 6 is a flowchart of a method for activating the network storage in a scenario where client 1 is participating in a conference and requests the network storage during the ongoing session, but the Focus does not support the storage function in joining the conference. The method includes the following steps:

Step 601: Client 1 sends a SIP INFO message to the message processing server, requesting to activate the network storage to store the content from session in which client 1 participates. The message processing server returns a SIP 200 OK response indicating that the request is received.

Step 602: The message processing server determines that it is not located in the media channel of the session and that the session in which client 1 participates is a conference session, and sends a SIP REFER request to the HF, instructing the HF to join the conference. The HF returns a SIP 200 OK response.

Step 603: The HF sends a SIP INVITE request to the Focus, requesting to join the conference, where the SIP INVITE request indicates that the HF requires the Focus to regard the HF as a special conference participant. After receiving the SIP INVITE request, the Focus determines that it does not support the function required by the HF, and thus returns a SIP 420 Bad Extension ACK.

Step 604: The HF sends a SIP NOTIFY message indicating that the HF fails to join the conference to the message processing server. The message processing server returns a SIP 200 OK response.

Step 605 to step 606: The message processing server determines that the session in which the client 1 participates and of which the content should be stored is a conference session and that the message processing server is not located in the media channel, and sends a re-INVITE request to the Focus and client 1 respectively, requesting to change the session media, so that the message processing server is located in the media channel between the Focus and client 2. After receiving the re-INVITE request, the Focus and client 2 return a SIP 200 OK response respectively. The message processing server sends a SIP ACK request to the Focus and client 2 respectively, and establishes a media stream with client 1 and client 2 respectively, so that the message processing server changes the original direct media stream between the Focus and client 1 to a media stream exchanged between the Focus and client 1.

Step 607: The message processing server sends a SIP INVITE request to the HF, requesting to establish a session with the HF to send the network storage content. The HF accepts the invitation and returns a SIP 200 OK response to the message processing server; the message processing server sends a SIP ACK request, and establishes a session with the HF to send the content to be stored.

Step 608: The message processing server sends a SIP INFO request indicating that the network storage is already implemented to client 1. Client 1 returns a SIP 200 OK response indicating that the SIP INFO request is already received.

Certainly, after the network storage is implemented for the content from the session in which client 1 participates, the user may deactivate the network storage of the content from the session in which the client participates through the message processing server. The specific implementation mode is the same as that for deactivating the network storage shown in FIG. 3, and is not further described.

In addition, if the message processing server determines that it is located in the media channel in step 602, the process goes to step 607 directly.

Figure 7:
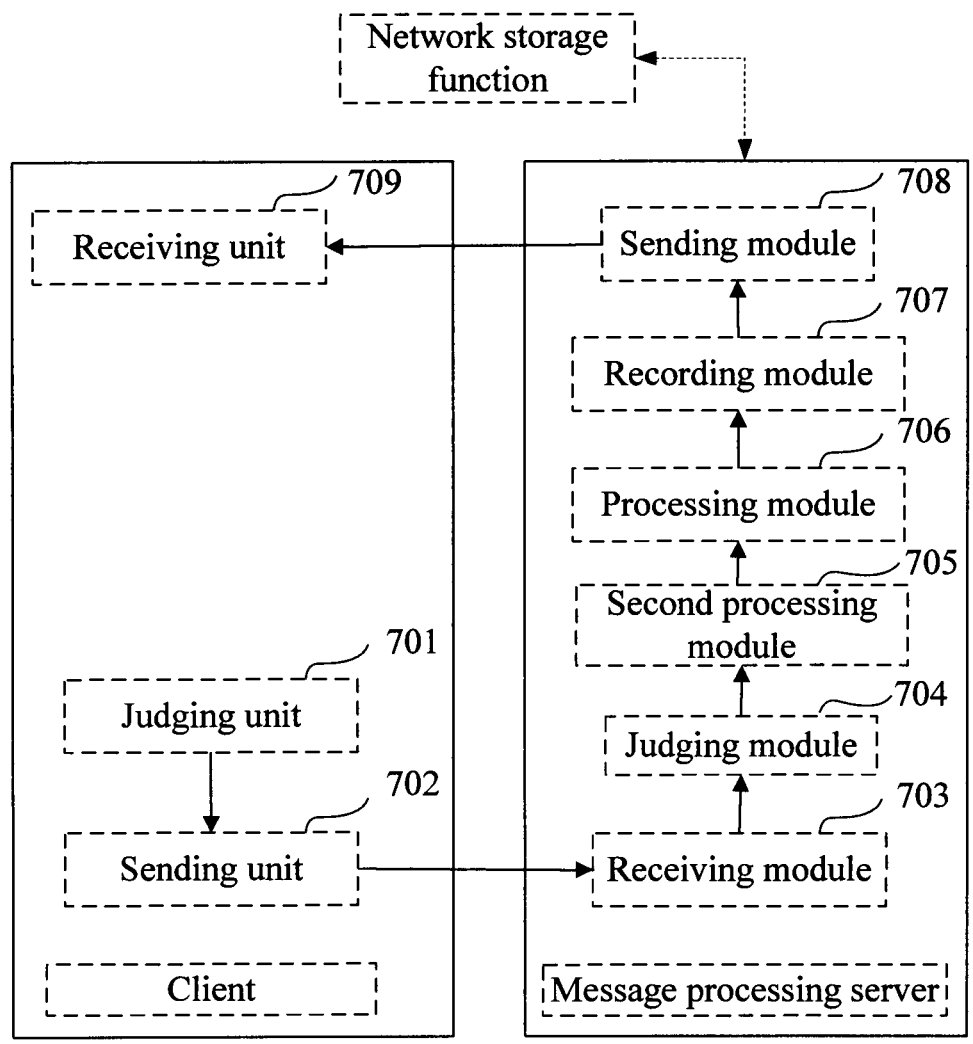
FIG. 7 is a flowchart of a method for implementing network storage according to an embodiment of the present invention.

As shown in FIG. 7, a message processing server provided according to an embodiment of the present invention includes: a receiving module 703, configured to receive a network storage request from the client; and a processing module 706, configured to establish a session with the HF according to the network storage request, and send the content from the session in which the client participates to the HF through the session with the HF.

The message processing server provided in this embodiment may further include: a judging module 704, configured to determine that the message processing server is not located in the media channel of the session in which the client participates; and a second processing module 705, configured to change the media attribute of the session in which the client participates, so that the message processing server is located in the media channel of the session in which the client participates.

The judging module 704 of the message processing server provided in this embodiment may be further configured to determine that the session in which the client participates is a conference session; the second processing module 705 may be further configured to change the media attribute of the session in which the client participates, so that the message processing server is located in the media channel of the session in which the client participates.

In addition, the judging module 704 of the message processing server may be further configured to judge whether the session in which the client participates is a conference session. If the judging module 704 determines that the session in which the client participates is a conference session, the second processing module 705 instructs the HF to join the conference. The receiving module 703 of the message processing server is further configured to receive a notification indicating that the HF fails to join the conference from the HF after the HF receives an instruction for joining the conference from the message processing server.

The receiving module 703 of the message processing server is further configured to receive a network storage deactivation request from the client; the processing module 705 is further configured to terminate the session with the HF.

The message processing server provided in this embodiment further includes: a recording module 707, configured to record the network storage mode; and a sending module 708, configured to return a network storage deactivation response to the client.

Further, an embodiment of the present invention provides a client, as shown in FIG. 7. The client includes: a judging unit 701, configured to determine that a session in which the client participates is not a conference session; and a sending unit 702, configured to send a network storage request to instruct the message processing server to activate network storage. The client further includes a receiving unit 709 configured to receive a notification indicating that the HF fails to join the conference. The judging unit 701 is further configured to determine that the session in which the client participates is a conference session.

An embodiment of the present invention also provides a system. The system includes an HF and a message processing server. The message processing server is configured to receive a network activation request from the client according to the judgment of the client, and activate network storage according to the network storage activation request. The HF is configured to: establish a session with the message processing server according to an instruction from the message processing server, and receive and store the session content of the client through the session. Certainly, the specific process of the message processing server is the same as that provided in the foregoing embodiments.

It is understandable to those skilled in the art that the present invention may be implemented through software and a necessary universal hardware platform or through hardware only. In most circumstances, the former mode is preferred. Therefore, the essence of the technical solution under the present invention or the contributions to the prior art may be embodied as a software product. The software product is stored in a storage medium, and includes several instructions that enable a mobile device (a mobile phone, a personal computer, or a media player) to perform the methods provided in the embodiments of the present invention. The storage medium may be a Read Only Memory/Random Access Memory (ROM/RAM), a magnetic disk or a Compact Disk-Read Only Memory (CD-ROM).

It is apparent that those skilled in the art can make various modifications and variations to the invention without departing from the spirit and scope of the invention. The invention is intended to cover the modifications and variations provided that they fall within the scope of protection defined by the claims or their equivalents.

What is claimed is:

1. A method for activating network storage implemented at a message processing server, the method comprising:
   receiving a network storage request from a client;
   determining that a session associated with content to be stored is a conference session;
   sending a Session Initiation Protocol (SIP) refer message to a history function (HF) that instructs the HF to join the conference session;
   determining that the HF has not successfully joined the conference session after receiving a SIP notify message from the HF;
   sending, based at least in part on the determination that the HF has not successfully joined the conference session a media change request to all participants of the conference session to change a media channel of the conference session such that the message processing server is located in the media channel of the conference session;
   establishing, a session with the HF according to the network storage request; and sending the content from the conference session in which the client participates to the HF through the session with the HF.

2. The method of claim 1, wherein receiving the network storage request from the client comprises receiving, by the message processing server, a network storage request that the client sends after the client determines that the session in which the client participates is the conference session.

3. The method of claim 1, further comprising recording, by the message processing server, a network storage mode.

4. The method of claim 1, further comprising receiving, by the message processing server, a network storage deactivation request from the client, and terminating the session with the HF.

5. The method of claim 4, wherein the message processing server returns a network storage deactivation response to the client.

6. A message processing server comprising:
a receiving module configured to receive a network storage request from a client;
a judging module configured to determine that a session associated with content to be stored is a conference session, send a Session Initiation Protocol (SIP) refer message to a history function (HF) that instructs the HF to join the conference session, and determine that the HF has not successfully joined the conference session after the receiving module receives a SIP notify message from the HF;
a first processing module configured to, after the judging module determines that the HF has not successfully joined the conference session, send a media change request to all participants of the conference session to change a media channel of the conference session such that the message processing server is located in the media channel of the conference session; and
a second processing module configured to establish a session with the HF according to the network storage request and send the content from the session in which the client participates to the HF according to the session with the HF.

7. The message processing server of claim 6, wherein the receiving module is further configured to receive a network storage deactivation request from the client, and wherein the processing module is further configured to terminate the session with the HF.

8. The message processing server of claim 6, further comprising a recording module configured to record a network storage mode.

9. The message processing server of claim 6, further comprising a sending module configured to return a network storage deactivation response to the client.

10. The method of claim 1, wherein the SIP refer message comprises a conference create request that carries addresses of the conference session participants and the HF to a controlling function (CF).

11. The method of claim 10, wherein the SIP refer message further comprises instructions that instruct the CF to create a new session and invite the conference session participants and the HF to the new session.

12. The message processing server of claim 6, wherein the SIP refer message comprises a conference create request that carries addresses of the conference session participants and the HF to a controlling function (CF).

13. The message processing server of claim 12, wherein the SIP refer message further comprises instructions that instruct the CF to create a new session and invite the conference session participants and the HF to the new session.

* * * * *